June 6, 1950     E. A. PENNINGTON     2,510,833
CROSSHEAD
Filed Nov. 20, 1945     2 Sheets-Sheet 1
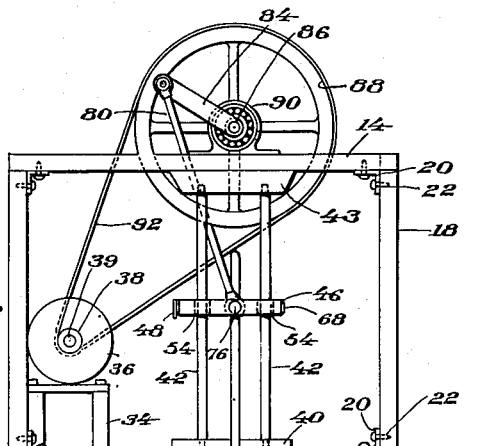
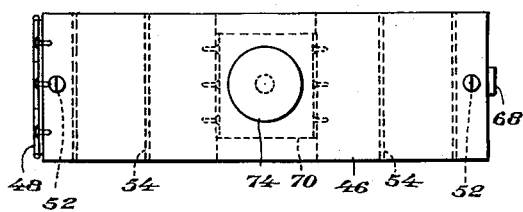
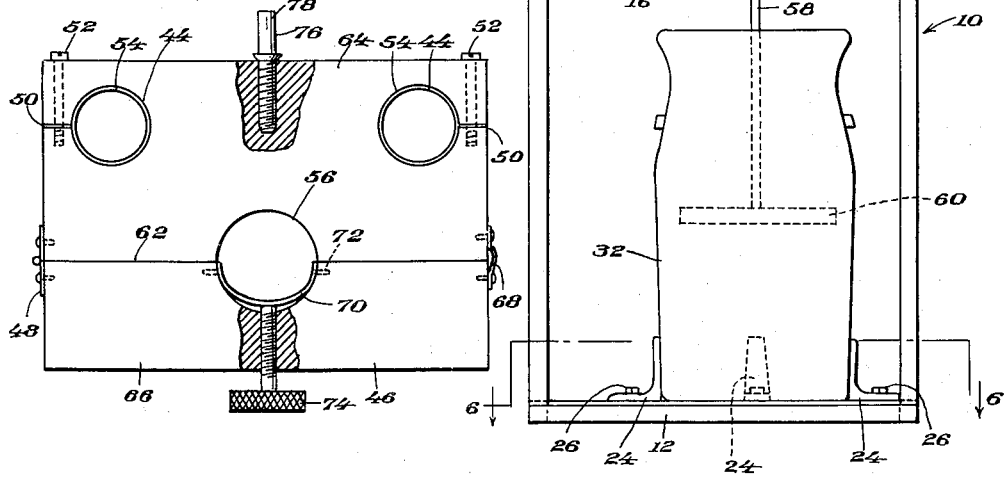
INVENTOR.
E. A. Pennington
BY Victor J. Evans & Co.
ATTORNEYS June 6, 1950 E. A. PENNINGTON 2,510,833
CROSSHEAD
Filed Nov. 20, 1945 2 Sheets-Sheet 2
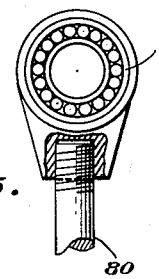
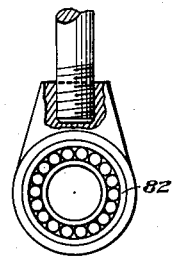
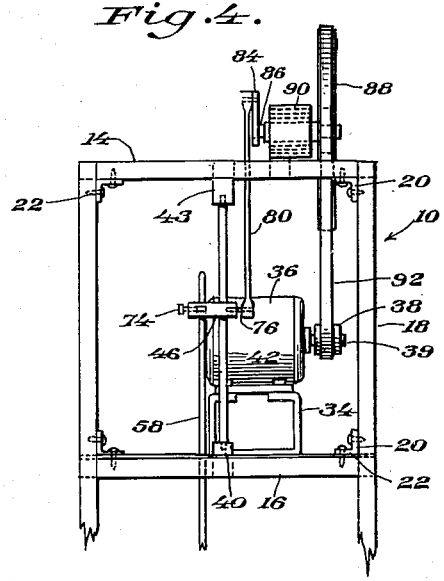
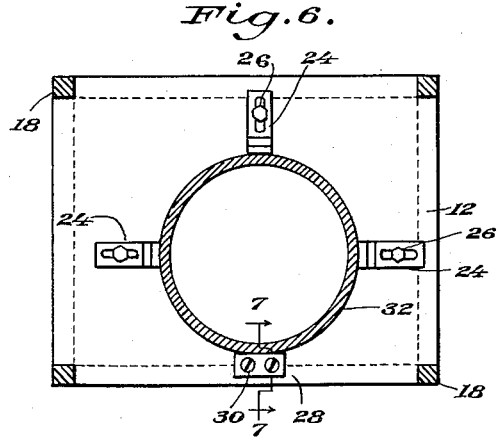
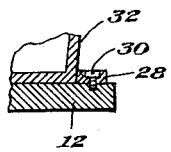
INVENTOR.
E A Pennington
BY Victor J. Evans & Co.
ATTORNEYS Patented June 6, 1950

2,510,833

UNITED STATES PATENT OFFICE 2,510,833

CROSSHEAD

Elonza A. Pennington, Arkadelphia, Ark.

Application November 20, 1945, Serial No. 629,789

2 Claims. (Cl. 308—3)

This invention relates to an improved churner which is to be used for making butter from milk or cream without the use of manual labor.

An object of the invention is to provide a churner having an operating mechanism mounted on a supporting stand, whereby a vertically movable dasher has rotary operating mechanism co-acting therewith for imparting vertical reciprocatory movement to said dasher.

Another object of the invention is to provide a churner that is simple, durable and will expeditiously churn cream and milk into butter.

With the foregoing and other objects and advantages in view, the invention consists of the novel details of construction, arrangement and combination of parts more fully hereinafter described, claimed and illustrated in the accompanying drawings, in which:

Figure 1 is a side elevational view of an embodiment of the invention;

Figure 2 is a side view of the dasher supporting block;

Figure 3 is a plan view thereof;

Figure 4 is a view of the device turned 90 degrees from the position shown in Figure 1;

Figure 5 is a view, partly broken, and partly in section of the pitman rod;

Figure 6 is a top view of the container supporting member on the line 6—6 of Figure 1, and Figure 7 is a sectional view on the line 7—7 of Figure 6.

Referring more in detail to the drawing, the reference numeral 10 designates the supporting stand having the base 12, upper frame 14 and intermediate cross-piece or partition or platform 16 which are connected at their respective corners by uprights 18 and brackets 20, being the connecting mediums for the top 14 and partitions 16 by means of fasteners 22.

Positioned on the base or bottom 12 are three brackets 24 which are adjustably mounted thereon by screws 26, two of the brackets 24 are diametrically opposed while the other bracket is positioned opposite to a block 28 having countersunk openings therein to receive fasteners 30 to fixedly attach the block 28 to the base.

Thus, a container 32 can be placed with the brackets 24 and block 28 and by adjusting the brackets 24 to the size of the container 32, the container 32 can be retained in fixed position on the base 12.

Fixed to the partition 16 is a motor support 34 for the motor 36, having a pulley 38 on the drive shaft 39 thereof.

Secured to the upper side of the partition 16 in line with the container 32 is the block 40 for supporting the lower ends of the guide rods 42, the upper ends of which are supported from the upper frame by the block 43. The rods 42 are parallel and are adapted to be positioned in the openings 44 in the guide block 46 which are diametrically opposed to each other and have slots 50 communicating therewith whereby screws 52, when tightened, will retain a bushing 54 in the openings 48.

Positioned intermediately of but offset from the openings 44 is the opening 56 which is adapted to receive the dasher stem 58 of the dasher 60. The block 46 is split at 62 providing a base 64 and a clamp 66 which is secured by a hinge 48 on one side of the base and by a catch 68 on the other side in order that the clamp 66 may be swung outwardly to receive the stem 58 of the dasher 60. A spring clamp 70 is secured to the inside of the semi-circular portion of the opening 56 by fasteners 72 and a screw nut 74 actuates the spring 70 to grasp the stem 58 of the dasher 60 to adjustably position the block 46 on the stem 58 as desired.

A pin 76 is threadably connected to the block 46 on the side opposite to the nut 74 and is provided with a bearing end 78 to receive one end of the pitman arm 80 which is provided at both ends with ball races 82.

The other end of the arm 80 is connected to the crank arm 84 of the shaft 86 on which the flywheel 88 is fixedly mounted, the shaft 86 being rotatably mounted in the bearing 90 fixed to the top 14 of the stand 10 and a belt 92 trained over the flywheel 88 and pulley 38 causes operation of the flywheel 88 in the usual manner.

The dasher 60 can be adjusted as previously described for any desired stroke within the container 32 and it is believed the operation of the device will be apparent to those skilled in the art.

It is to be understood that minor changes in the details of construction, arrangement and combination of the various parts may be resorted to without departing from the spirit of the invention or the scope of the appended claims.

Having thus described the invention, what is claimed as new and desired to be secured by Letters Patent is:

1. In a cross head for reciprocating a churn dasher, the combination which comprises a pair of vertically disposed parallel rods, a horizontally disposed block providing a base and having spaced openings therethrough through which the said parallel rods extend, bushings positioned in the said openings to facilitate sliding movement of the rods therein, said base having slots therein extended inwardly from the ends to the said spaced openings, bolts extended into the base from the side thereof adjacent the said spaced openings and extended through the slots between the ends of the block and openings, the inner ends of the bolts threaded into the block on the side of the slots opposite to the side of the block from which the bolts extend whereby the bolts clamp the bushings in the openings, a centrally disposed stud extended from the side of the openings from which the said bolts extend into the block providing journaling means for a pitman, said block having a centrally disposed semi-circular recess in the side opposite to that from which the bolts extend into the block, the axis of said recess being positioned in a vertical plane extended through the stud and said recess being offset from the said spaced openings of the block, a clamp positioned against the side of the block opposite to that from which the bolts extend into the block, said clamp having a complementary centrally disposed semi-circular recess positioned to register with the semi-circular recess of the block, a hinge pivotally connecting the clamp to the block at one side, a latch positioned on the end of the block opposite to that on which the hinge is positioned for temporarily securing the clamp against the side of the block, an arcuate spring clamp positioned in the semi-circular recess of the said clamp, and a thumb screw threaded in the clamp for adjusting the position of the said spring clamp.

2. A cross head for use with mechanism for operating the dasher of a churn including a pair of vertically disposed guide rods and a power actuated mechanism comprising a rectangular shaped block-like body having front and rear sides and ends with spaced openings extended therethrough and positioned adjacent the rear side of the block, bushings in the said spaced openings, means adjustably clamping the bushings in the openings, a rectangular shaped block-like clamp positioned against the front side of the block, a hinge pivotally connecting the clamp to the block at one end, a latch temporarily securing the clamp to the block at the opposite end, said block and clamp having registering semi-circular openings in the meeting edges thereof for receiving the dasher of the churn, means carried by the block and positioned to engage the dasher for retaining the dasher in fixed relation to the block, and means on the opposite side of the block for providing an operable connection between the said block and the power actuated mechanism.

ELONZA A. PENNINGTON.

REFERENCES CITED

The following references are of record in the file of this patent:

UNITED STATES PATENTS

| Number | Name | Date |
|---|---|---|
| 393,069 | Heltsley | Nov. 20, 1888 |
| 816,621 | Van Dusen | Apr. 3, 1906 |
| 867,179 | Williams | Sept. 24, 1907 |
| 923,644 | Griggs | June 1, 1909 |
| 934,537 | Johnson | Sept. 21, 1909 |
| 945,639 | Taylor et al. | Jan. 4, 1910 |
| 1,436,915 | Shoemaker | Nov. 28, 1922 |
| 1,900,626 | Williams | Mar. 7, 1933 |
| 2,039,934 | Russell | May 5, 1936 |
| 2,192,014 | Muchnic | Feb. 27, 1940 |